United States Patent [19]

Perlinski

[11] Patent Number: 5,403,884
[45] Date of Patent: Apr. 4, 1995

[54] PROCESS FOR FLOCKING EDPM SUBSTRATES

[75] Inventor: Witold Perlinski, Middlesex, N.J.

[73] Assignee: National Starch And Chemical Investment Holding Corporation, Wilmington, Del.

[21] Appl. No.: 3,765

[22] Filed: Jan. 13, 1993

[51] Int. Cl.$^6$ .................................. C08L 9/00
[52] U.S. Cl. ..................... 524/524; 523/300
[58] Field of Search .......... 524/524; 523/300

[56] References Cited

U.S. PATENT DOCUMENTS

| | | | |
|---|---|---|---|
| 3,681,515 | 8/1972 | Mildner | 174/107 |
| 3,795,540 | 2/1974 | Mildner | 117/226 |
| 4,122,219 | 10/1978 | Fickeisen et al. | 428/90 |
| 4,267,219 | 5/1981 | Ueno et al. | 524/460 |
| 4,535,121 | 8/1985 | Ozelli et al. | 524/715 |
| 4,725,492 | 2/1988 | Yazaki et al. | 428/317.7 |
| 4,762,750 | 8/1988 | Girgis et al. | 428/378 |
| 4,835,226 | 5/1989 | Warren et al. | 525/504 |
| 4,857,566 | 8/1989 | Heibling | 523/409 |
| 4,859,540 | 8/1989 | Bragole | 428/421 |
| 4,879,333 | 11/1989 | Frazer | 524/460 |
| 4,882,386 | 11/1989 | Stella | 525/133 |
| 4,918,119 | 4/1990 | Seltmann et al. | 523/461 |
| 5,114,481 | 5/1992 | Lynch | 106/170 |
| 5,114,484 | 5/1992 | Lynch | 106/170 |

OTHER PUBLICATIONS

Technical Bulletin: *Adhesives and Coatings*, Morton International, Chicago, Ill. Dec. 1988.
Technical Bulletin: *PRIMACOR*, Dow Chemical U.S.A., Saddle Brook, N.J., 1984.
Technical Bulletin: *PRIMACOR: Adhesive Polymers For Specialty Hot Melt Adhesives*, Dow Chemical, U.S.A., Midland, Mich., 1984.
Technical Data Sheet: *Styronal® ND 638*, BASF Corporation, Chattanooga, Tenn., 1988.
Technical Information: *NUCREL® 599*, DuPont Company, Wilmington, Del., Sep. 1986.

*Primary Examiner*—Paul R. Michl
*Assistant Examiner*—Edward Cain
*Attorney, Agent, or Firm*—Ellen T. Dec; William K. Wissing

[57] ABSTRACT

A process for flocking cured or uncured elastomeric substrates comprising the steps of applying to the substrate an aqueous adhesive comprising 10 to 100% (dry weight) of an alkaline dispersion of an ethylene carboxylic acid copolymer and 0 to 90% of an aqueous elastomeric dispersion; electrostatically applying flocking fibers thereto; and drying the thus flocked substrate.

19 Claims, No Drawings

PROCESS FOR FLOCKING EDPM SUBSTRATES

BACKGROUND OF THE INVENTION

The preparation of flocked articles wherein flocks are fixed to the surface of an elastomeric material such as ethylene propylenediene terpolymers (EDPM) through an adhesive layer is well known. In such processes, the EDPM surface is coated with a layer of the adhesive and short staple fibers are applied perpendicularly thereof utilizing an electrical field. The resulting electrostatically flocked articles are characterized by a fabric-like surface of relatively low friction. This feature renders flocked articles particularly suitable for the purpose of reducing friction between the sliding glass window and window channel of automobiles. In view of the mechanical stresses involved in this application, it is imperative that the adhesive used to bond the flock to the elastomer not only bond to the flock but also to the elastomer substrate so that the flocks do not become detached from the adhesive layer as a result of the repeated opening and closing of the window.

Previous adhesives utilized for these applications have comprised one and two part urethanes dissolved in a solvent which could be quickly volatilized so that there is no risk of explosion when the flocking is carried out using high-voltage electrical fields in flocking cubicles. In view of environmental concerns, there is thus an increasing movement to water based adhesives for these flocking applications. However, as a result of the stringent properties required for these applications, it has been difficult to provide a commercially acceptable product which would exhibit the necessary adhesion in conjunction with the high degree of water and heat resistance needed for this end use.

SUMMARY OF THE INVENTION

I have now found that waterborne adhesives particularly adapted for flocking on cured or uncured elastomeric substrates may be prepared by the addition from an alkalene dispersion of an ethylene carboxylic acid copolymer, preferably by the addition of the copolymer to an elastomer dispersion. Optionally, a crosslinker for carboxy functionality such as aziridynes, epoxies or multifunctional carbodiimides may be added to the adhesive just prior to application. The resulting adhesives provide the environmental benefits resulting from the use of water as solvent together with the balance of adhesive peel strength, water and heat resistance previously obtained with two part organic solvented polyurethane adhesives.

Thus, the present invention is directed to a process for flocking cured or uncured elastomeric substrates comprising the steps of applying to the substrate an aqueous adhesive composition comprising 10 to 100% (by weight) of an ethylene carboxylic acid copolymer and 0 to 90% of an elastomeric dispersion; and electrostatically applying thereto flocking fibers.

DETAILED DESCRIPTION OF THE PREFERRED EMBODIMENTS

The ethylene carboxylic acid copolymer which is used in accordance with this invention is a normally solid thermoplastic polymer of ethylene modified by monomers having reactive carboxyl groups, particularly a copolymer of a major proportion of ethylene and a minor proportion, typically from about 1 to about 30, preferably from about 2 to about 20, percent by weight, of an ethylenically unsaturated carboxylic acid. Specific examples of suitable such ethylenically unsaturated carboxylic acids (which term includes mono- and polybasic acids, acid anhydrides, and partial esters of polybasic acids) are acrylic acid, methacrylic acid, crotonic acid, fumaric acid, maleic acid, itaconic acid, maleic anhydride, monomethyl maleate, monoethyl maleate, monomethyl fumarate, monoethyl fumarate, tripropylene glycol monomethyl ether acid maleate, ethylene glycol monophenyl ether acid maleate, etc. The carboxylic acid monomer is preferably selected from $\alpha,\beta$-ethylenically unsaturated mono- and polycarboxylic acids and acid anhydrides having from 3 to 8 carbon atoms per molecule and partial esters of such polycarboxylic acid wherein the acid moiety has at least one carboxylic acid group and the alcohol moiety has from 1 to 20 carbon atoms. The copolymer may consist essentially of ethylene and one or more of such ethylenically unsaturated acid comonomers or can also contain small amounts of other monomers copolymerizable with ethylene. Thus, the copolymer can contain other copolymerizable monomers including an ester of acrylic acid. The comonomers can be combined in the copolymer in any way, e.g., as random copolymers, as block or sequential copolymers, or as graft copolymers.

Materials of these kinds are known to the art and are made by subjecting a mixture of the starting monomers to elevated temperatures, usually from about 90° C. to about 300° C., preferably from about 120° to about 280° C., and at higher pressure, usually above 1000 atmospheres, preferably between 1000 and 3000 atmospheres, preferably in the presence of a free-radical initiator such as oxygen, a peroxygen compound, or an azo compound.

Alternatively, copolymers of ethylene with about 20% acrylic acid are available from Dow Chemical under the Primacor tradename. Specifically, Primacor 4990, a 34.2% aqueous dispersion of a copolymer of ethylene, and about 20% acrylic acid having a melt index of 1300 and Primacor 4983 or Adcote 50T4983 (Morton International), both of which are 25% aqueous dispersions of a copolymer of ethylene and about 20% acrylic acid having a melt index of about 300. Solid Primacor resins are also available from Dow Chemical and can be dispersed in water and alkali. Suitable solid Primacors include Primacor 5990, Primacor 5980 and the like. The molecular weight of the Primacor resins are less than about 20,000 number average. Also useful herein are the ethylene acrylic acid copolymers containing 5 to 15% acrylic acid and having melt viscosities within the range of 500 to 650 cps which are available from Allied Signal as AC 580 and AC 5120 or from DuPont as Nucrel 599.

The ethylene/carboxylic acid copolymer is generally used in an amount of 10 to 100%, preferably 50 to 70% by weight (dry) of the flocking adhesive composition.

The ethylene carboxylic acid polymer is added to an aqueous dispersion of an elastomer. As used herein the term "elastomer" includes a substance capable of being extended to twice its own length at 68° C. and on release of the stress returns with force to approximately its original length all within a reasonable period of time. These materials have glass transition temperatures (Tg) of around 0° C. or less. The Tg can be determined by any method know to those skilled in the art; for example, nuclear magnetic resonance peak ratio or by less complicated methods involving more approximation like differential thermal analysis. The elastomeric materials can have limited branching, aromatic content and/or polar functionality as long as the Tg of the material is less than around 0° C.

One type of elastomeric polymer that is water soluble, dispersible or emulsifiable that can be employed are the elastomeric, ethylene-containing interpolymers. The interpolymer, which is usually a copolymer or terpolymer, is formed from ethylene monomer and one or more polar comonomers, where the comonomer may vary from co-crystallizing with the polyethylene crystal structure or resulting in an essentially noncrystalline (amorphous) interpolymer. Examples of these polar comonomers include: vinyl acetate, methyl acrylic acid, ethyl acrylic acid, styrene, alpha methyl styrene, methyl methacrylic acid, acrylamide, methyacrylic acid, n-methyl-n-vinyl acetamide, diethyl fumarate, diethyl maleate, n-vinyl pyrrolidone, n-vinyl succinimide and diethyl fumarate, diethyl maleate, n-vinyl pyrrolidone, n-vinyl succinimide and the like and mixtures thereof. The interpolymer has a ratio of the temperature (Tg) of the polar comonomers sufficient to have a glass transition temperature (Tg) of around 0° C. or less. The interpolymers are also water soluble, emulsifiable or dispersible with the use of suitable emulsifiers and/or solvents.

Another class of elastomeric polymers that may be used herein are the water soluble, dispersible or emulsifiable elastomeric polyurethanes. By the use of the term polyurethane urea type polymer. By elastomeric, it is meant that the film of the polyurethane alone has a gens and di and/or polyisocyanates, wherein the resulting polymer is an elastomeric curable polyurethane or polyurethane urea type polymer. By elastomeric, it is meant that the film of the polyurethane alone has a hardness of about 10 shore A to about 75 to 80 shore D with a preferred hardness of shore A 60 to 100 and elongation of the order of 100 to 800 percent. The Shore hardness test is conducted on a Shore durometer by standard procedures, and elongation is measured in accordance with ASTM testing procedure, D412. Preferably, the organic compounds with at least two active hydrogens is a polyol such as a polyester polyol or polyether polyol and most preferably, a polyol which is linear. Examples of polyester-based polyurethane elastomers include those where the polyester is prepared from carboxylic acid such as adipic and the glycol portion can be selected from such materials as ethylene glycol, 1,2-propylene glycol, 1,3-butylene glycol and 1,4-butylene glycol. Further examples of polyfunctional polyesters which can be used are those based on phthalic anhydride, adipic acid, ethylene glycol, trimethylol propane, and the like. A slight amount of branching of the polyol can be tolerated but the degree of functionality or branching of the polyol should be kept to a minimum since increased branching results in films that are tougher, harder and less flexible. The di- or polyisocyanates generally used to form the polyurethane are selected from aromatic, aliphatic and mixtures thereof, isocyanates, but the aliphatic isocyanates are preferred. Examples of the polyisocyanates that can be used include the aromatic isocyanate of toluene diisocyanate and the aliphatic isocyanates such as hexamethylene diisocyanate, methylcyclohexylene diisocyanate, dicyclohexyl methane diisocyanate, lysine diisocyanate where the aliphatic group is methyl or ethyl, bis(2-isocyanato ethyl) fumarate, bis(2-isocyanato ethyl) carbonate and dimeryl diisocyanate, where the organic group is essentially a C36 hydrocarbon radical. Another isocyanate that may be used is 4,4'-diphenyl methane diisocyanate. The polyurethane polymer can be made as a curable material by any method known to those skilled in the art, for instance, additional monomers like diisocyanate, polyols or epoxies can be added to the polymer and/or a curable moiety can be introduced into the polymer.

Examples of the aforementioned reactive groups or moieties used to make the curable polyurethane elastomer are hydroxyls, epoxies, ureas, amines, amides, and olefinic groups, or reactive methylene or olefinic groups. The polyurethane polymers can be produced by any one-shot or single step method known to those skilled in the art or by the two step chain extension process utilizing linear or lightly branched polyols with the necessary molar portions of the diisocyanate known to those skilled in the art to produce a water dispersible polyurethane. One or more or a mixture of these various curable polyurethanes can be used in the aqueous flocking adhesives of the present invention.

These elastomeric curable polyurethanes are water soluble, emulsifiable or dispersible through the use of dispersing agents and emulsifiers which can have a nonionic, and/or anionic and/or amphoteric or zwitterionic nature. In addition, the polyurethane polymers can be internally emulsified by incorporating one or more dispersing agents or emulsifiers with the other polyurethane producing monomers to produce the polyurethane polymer, representative of which is Dispercoll 585 from Miles. The curable polyurethane has a maximum curability through crosslinking of a maximum of around 10 percent or less based on the solids or residue of the aqueous impregnating composition or on a dry basis.

Specific examples of commercially available polyurethane polymers that can be used include the aliphatic polyurethane dispersions such as Witcobond W-234, an anionically charged polyurethane available from Witco Chemical Corporation having a solids content of 30 percent and a density of 8.8 lb/gal. The pH at 25° C. (77° F.) is 8.0, and the viscosity at 25° C. (77° F.) is measured by Brookfield LVF in cps is 100, and the surface tension in dynes/cm is 54. The preferred polyurethane is the Witcobond W-290H material, an aliphatic type polyurethane with a 65 percent solids level, a pH at 25° C. (77° F.) of 7.5 and a viscosity as measured by Brookfield LVF in cps of 200 and a surface tension of 42 dynes/cm. The film properties of the 290H material are 4500 psi tensile strength, 720 percent elongation and moduli of 250 psi at 100%, 540 psi at 300% and 1550 psi at 500%. Also useful herein are Dispercoll E-585 polyurethane from Miles and Luphen D-200 from BASF.

Additional types of aqueous soluble, dispersible or emulsifiable elastomeric polymers that can be employed in the flocking adhesive compositions include elastomeric silicones such as elastomers formed from polydiorganosiloxanes with hydroxyl and/or alkoxy functionality with the use of polydiorganosiloxanes with hydroxyl and/or alkoxy functionality with the use of internal or external emulsifiers, for instance, an alkylene oxide type internal emulsifier. Also silicones formed from 3,3,3-trifluoropropylmethylsiloxane can be employed. Further examples of elastomers include fluororubbers such as copolymers of vinylidene fluoride and perfluoro propylene, polysulfide polymers, ethylene propylene rubber and polyethers.

The elastomeric polymer may also be a diene-containing elastomeric polymer which is water dispersible or emulsifiable. Examples of suitable diene-containing elastomers include polybutadiene homopolymer, and carboxylated styrene-butadiene and the like. Suitable examples of elastomers include: elastomeric reaction products formed by the reaction of 1,3-diene hydrocarbon monomers such as butadiene-1,3; isoprene, 2,3-dimethyl-1,3-butadiene, 2-2-ethyl-1,3-butadiene and the like alone as homopolymers or in mixtures as interpolymers; or ethylene-propylene-diene rubbers (EPDM) produced in a suitable manner from such dienes as dicyclopentadiene, 5-ethylidene-2-norborene, 1,4-hexadiene,5-methylene-2-norborene interpolymerized with ethylene and an alpha-mono-olefin having from 3 to 20 carbon atoms such as propylene; nitrile rubber such as nitrile butadiene latex; or butyl rubber which is a commercial name for copolymers of isobutylene with small amounts of butadiene or isoprene or mixtures thereof.

An example of a commercially available diene-containing elastomer latex that can be used includes a 1,3-polybutadiene homopolymer latex available under the trade designation "LPM-6290" from Goodyear Tire and Rubber Company having a total solids of 43 to 46 percent, a pH of 8 to 9.5, a maximum viscosity of 6,000 centipoise (FFT 1 at 20 rpm), a maximum coagulum of 0.05 percent max and a mechanical stability of 55 to 75 milligrams and surface tension of around 58 to 74 dynes per centimeter, and particle size in the range of 500 to 2,000 angstroms and a maximum gel content of 25 percent. A preferred example of a suitable diene containing elastomer includes the latex available from BASF under the trade designation Styronal ND 638, a carboxylated styrene butadiene emulsion containing about 56% styrene.

The flocking adhesives used in the invention may also contain in the disperse phase a crosslinking agent which is effective for crosslinking the carboxylated crosslinkable polymers involved and which is added to the adhesive just prior to use. When present, these crosslinking agents are used in amounts of 1 to 30% by weight of dry polymer. Suitable water dispersable crosslinking agents for use in this invention which can interreact with such polymers at ambient temperatures and pressures are preferably polyfunctional aziridines, epoxies and multifunctional carbodiimides. These materials are known in the prior art and are available commercially.

Carbodiimides (sometimes also called cyanamides) are a well-known class of organic compounds believed to have the general structure:

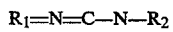

where $R_1$ and $R_2$ are each an organic moiety. Carbodiimides crosslink with carboxylic acid groups to form N-acyl ureas.

A presently preferred multifunction carbodiimide is available commercially from Union Carbide under the trademark UCARLINK XL-29SE.

Aziridines are organic compounds based on the ring structure:

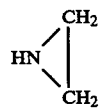

A presently preferred crosslinking polyfunctional aziridines are XAMA-2 or XAMA-7, available commercially from Hoechst Celanese or CX-100 from ICI.

Suitable epoxies include lower hydrocarbon epoxides like that containing 2 to 12 carbon atoms including styrene oxide, alpha phenyl propylene oxide trimethylene oxide, lower alkylene oxides like epoxides containing from 2 to 8 carbon atoms including ethylene oxide, propylene oxide, butylene oxide, isobutylene oxide and the like.

In addition, the adhesive compositions of the invention can contain conventional auxiliary methods such as filler materials such as carbon black and the like, pigments, viscosity improvers such as fumed silica, etc. Also, catalysts to facilitate curing can be incorporated. The preferred catalysts are DABCO (triethylenediamine) and Quadrol (N,N,N',N'-tetrakis(2-hydroxypropyl)ethylenediamine) and mixtures thereof.

The adhesives of the invention can be applied to, or coated onto cured or uncured elastomers which have preferably been subjected to additional surface treatment as by treating with chlorine solution or with corona discharge.

In the flocking of uncured elastomers, mixtures normally used in the vulcanization process such as, for example, fatty acids, oxides of magnesium calcium or zinc, the vulcanization accelerators, stabilizers, solvents, fillers and the like are shaped into the desired form and coated with the adhesive of the invention. The flock fibers are then applied in electrostatic field and the flocked elastomer is vulcanized for about 1 to 10 minutes at temperatures in the range of about 300° F. to 500° F. during which the adhesive is hardened.

In the coating of cured elastomers, the flock adhesive of the invention is applied or coated onto rubber in a conventional manner such as by dipping, spraying, brushing, and the like. After the coating, the fibers are applied in electrostatic field and the adhesive subsequently hardened for about 1 to 4 minutes at temperatures in the range of 300° to 500° F.

Various elastomers can be flocked before or after vulcanization using the adhesives of the invention. Illustrative of elastomeric materials that can be flocked are natural rubbers, polychloroprene rubber, nitrile rubber, chlorobutadiene, chlorinated isoprenes, butyl rubber, polyurethane rubber or elastomers based on styrene-butadiene or styrene-isoprene. In most instances, however, the adhesives will be used to flock elastomers based on ethylene/propylene copolymers (EPM) and terpolymers of ethylene, propylene and diene monomers such as, for example, diethylidene norbornene. Elastomers of this type are commercially available and are known collectively as EPDM elastomers.

The fibers applied using the adhesives of the invention include various synthetic fibers, for example, can be polyester fibers such as polyethylene terephthalate, polyamide fibers such as Nylon-6 or Nylon-6,6, polyurethane fibers, cotton fibers and/or cellulose fibers. Staple fibers having an average length of about 0.2 mm to about 2 mm are preferably used.

In most instances, the adhesives of the invention will be used to flock profiles of rubber elastomers which are employed for the lining of automobile window compartments. Other applications include the production of flocked mats, flocked flexible shafts, flocked floorcoverings, flocked rubber gloves, glass run channels, and the like.

The following examples are provided for purposes of illustrating the invention, it being understood that the invention is not limited to the examples nor to the specific details therein enumerated.

A series of flocking adhesives was prepared using the following components:

| Component | Amounts (Grams) | | | | | |
|---|---|---|---|---|---|---|
| | A | B | C | D | E | F |
| Adcote 50T4983[1] | 240 | 240 | 240 | 240 | 240 | 240 |
| Styronal ND 638[2] | 85 | — | — | 85 | — | — |
| Dispercol E585[3] | — | 100 | — | — | 100 | — |
| Witco 290H[4] | — | — | 62 | — | — | 62 |
| DMEA[5] | 10 | 0.5 | 2 | 10 | 0.5 | 2 |
| Proycel GXL[6] | 0.68 | 0.68 | 0.68 | 0.68 | 0.68 | 0.68 |
| Ucarlink XL29SE[7] | — | — | — | 30 | 30 | 30 |

[1] A 25% ammoniacol solution of an ethylene/acrylic acid copolymer containing about 20% arcylic acid, available from Morton Chemical
[2] A 47% emulsion of carboxylated styrene butadiene available from BASF
[3] A 40% emulsion of a fully reacted polyester/polyurethane from Miles Chemical (non-carboxylated)
[4] A 65% emulsion of a fully reacted polyester/polyurethane from Witco Chemical (carboxylated)
[5] A 25% dimethylamino ethanol used to raise the pH to 9-9.5
[6] A preservative from ICI
[7] A post added carbodiimide crosslinking agent from Union Carbide Representative physical properties of the adhesives are given for adhesives A and B below.

| | ADHESIVE | |
|---|---|---|
| | A | B |
| Solids | 30% | 29.4% |
| Viscosity | 120 cps. | 240 cps. |
| pH | 9.50 | 9.84 |

The following testing procedure was used to evaluate the adhesives.

Cured EPDM

Corona Surface Treatment:
1. Hot Mill EPDM Rubber 3 minutes at 230° F.
2. Sheet off 70–100 mil and cool
3. Cut 2.5"×5" sections
4. Cure 3.5 minutes at 425° F.
5. Cool to 100° F.
6. Corona treatment (50–54 dynes/cm)
7. Coat #60 wire bar (4–6 wet mils)
8. Electrostatically flock polyester fiber in wet state
9. Dry 2–4 minutes at 450° F. or as noted Flocked parts were cut into ½" wide strips, placed in molds and molten polyamide was poured over flocking to provide a method for testing the degree of adhesion of the flock to the substrate.

Upon cooling, flock adhesion was tested in peel mode at 180° angle initially or after exposure as noted.

Uncured EPDM

Treatment (<30° dynes/cm):
1. Hot mill EPDM-rubber: 3 minutes 230° F.
2. Sheet off 70–100 mil and cool
3. Cut 2.5"×5" sections
4. Coat adhesive with #60 wire bar
5. Electrostatically flock in the wet state
6. Dry cure 4 minutes at 450° F.
7. Coat molten polyamide as described previously Corona Surface Treatment:
1. Hot mill EPDM-rubber: 3 minutes 230° F.
2. Sheet off 70–100 mil and cool
3. Cut 2.5"×5" sections
4. Corona Treatment (48° dynes/cm)
5. Coat adhesive with #60 wire bar
6. Electrostatically flock in the wet state
7. Dry cure 4 minutes at 450° F.
8. Coat molten polyamide as described previously In the following test, uncured EDPM was evaluated for initial peel using adhesives A, B, D and E.

| | Uncured EPDM Rubber | |
|---|---|---|
| | No Treatment | Corona Treated |
| Adhesive A (Example) | 2.00 pli | 6.6 pli |
| Adhesive B (Example) | 1.20 pli | 4.20 pli |
| Adhesive D (Example) | 1.40 pli | 5.30 pli |
| Adhesive E (Example) | 3.60 pli | 19.50 pli |

Another series of evaluations of Adhesive A were performed using a different EDPM substrate. The results are shown below:

| | TEST RESULTS (Corona Treatment) | | | |
|---|---|---|---|---|
| DRYING TIME | RT PEEL | 24 HR. WATER IMMERSION | 10 DAY WATER IMMERSION | 7 DAY 80° C. |
| A. CURED EPDM RUBBER (precured before flocking 3.5 min. @ 425° F.) | | | | |
| 3 min. 425° F. | 9.2 lbs./in. | 9.1 lbs./in. | 8.9 | 8.0 |
| 4 min. 450° F. | 13.4 lbs./in. | 11.4 lbs./in. | 11.1 | 7.6 |
| B. UNCURED EPDM RUBBER - NO RUBBER CURE | | | | |
| 3 min. 450° F. | 8.5 | 8.9 | 8.4 | 7.5 |
| 3 min. 450° F.* | 2.8 | 3.0 | 3.1 | 2.5 |

*no surface treatment

What is claimed:

1. A process for flocking cured or uncured ethylene propylenediene terpolymer elastomeric substrates comprising the steps of applying to the substrate an aqueous adhesive comprising 10 to 100% by dry weight of an ethylene carboxylic acid copolymer in the form of an alkaline dispersion and 0 to 90% by dry weight of an elastomer in the form of an aqueous elastomeric dispersion; electrostatically applying flocking fibers thereto; and drying the thus flocked substrate.

2. The process of claim 1 wherein the aqueous adhesive additionally contains up to 30% by weight of the dry polymer of a crosslinking agent for the carboxyl functionality.

3. The process of claim 1 wherein the ethylene carboxylic acid copolymer is present in an amount of 50 to 70% by weight of the adhesive.

4. The process of claim 1 wherein the ethylene carboxylic acid copolymer is an ethylene acrylic acid copolymer containing 5 to 20% by weight acrylic acid.

5. The process of claim 1 wherein the elastomeric dispersion comprises a polyurethane polymer.

6. The process of claim 1 wherein the elastomeric dispersion comprises a carboxylated styrene butadiene polymer.

7. The process of claim 2 wherein the crosslinking agent is an aziridyne, an epoxy or a multifunctional carbodiimide.

8. The process of claim 1 wherein the elastomeric substrate is an ethylene propylene diene rubber.

9. The process of claim 1 wherein the elastomeric substrate has been corona treated prior to flocking.

10. The process of claim 7 wherein the crosslinking agent is a multifunctional carbodiimide.

11. A process for flocking cured or uncured ethylene propylenediene terpolymer elastomeric substrates comprising the steps of applying to the substrate an aqueous adhesive consisting essentially of 10 to 100% by dry weight of a polymer in the form of an alkaline dispersion, the polymer consisting essentially of 50 to 94% by weight ethylene, 5 to 20% acrylic acid and 1 to 30% by weight of dry polymer of a crosslinking agent for acrylic acid, the adhesive additionally containing 0 to 90% by dry weight of an elastomer in the form of an aqueous elastomeric dispersion; electrostatically applying flocking fibers thereto; and drying the thus flocked substrate.

12. An aqueous flocking adhesive consisting essentially of 50 to 70% by weight of an alkaline dispersion of a polymer consisting essentially of 50 to 94% by weight ethylene, 5 to 20% acrylic acid and 1 to 30% of a crosslinking agent for acrylic acid, the adhesive additionally containing 30 to 70% by weight of an elastomeric dispersion.

13. An aqueous flocking adhesive comprising in admixture:

50 to 70% by dry weight of an ethylene-carboxylic acid copolymer in the form of an alkaline dispersion, said copolymer consisting essentially of a major proportion of ethylene and a minor proportion of at least one crosslinkable monomer(s) having reactive carboxyl groups;

30 to 50% by dry weight of an elastomer in the form of an elastomeric dispersion; and 0 to 30% by weight of dry polymer of a crosslinking agent which is effective for crosslinking the carboxylated, crosslinkable monomer(s).

14. The adhesive of claim 13 wherein the elastomeric dispersion comprises a polyurethane polymer.

15. The adhesive of claim 13 wherein the elastomeric dispersion comprises a carboxylated styrene butadiene polymer.

16. The adhesive of claim 13 wherein the crosslinking agent is present in amounts from 1 to 30% by weight of dry polymer and the crosslinking agent is an aziridyne, an epoxy or a multifunctional carbodiimide.

17. The adhesive of claim 16 wherein the crosslinking agent is a multifunctional carbodiimide.

18. The flocking adhesive of claim 13 wherein the ethylene-carboxylic acid copolymer comprises 70–99% by weight ethylene.

19. The adhesive of claim 18 wherein the ethylene carboxylic acid copolymer is an ethylene acrylic acid copolymer containing 5 to 20% by weight acrylic acid.

* * * * *